US012583294B2

(12) United States Patent
Kumar

(10) Patent No.: US 12,583,294 B2
(45) Date of Patent: Mar. 24, 2026

(54) ACTIVE DYNAMIC SUN VISOR AND METHOD OF OPERATION THEREOF

(71) Applicant: ZF FRIEDRICHSHAFEN AG, Friedrichshafen (DE)

(72) Inventor: Harish Kumar, Novi, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 291 days.

(21) Appl. No.: 18/091,985

(22) Filed: Dec. 30, 2022

(65) Prior Publication Data

US 2024/0217317 A1    Jul. 4, 2024

(51) Int. Cl.
B60J 3/02 (2006.01)
B60R 11/00 (2006.01)
B60R 11/04 (2006.01)

(52) U.S. Cl.
CPC ..... B60J 3/0204 (2013.01); B60R 2011/0003 (2013.01); B60R 11/04 (2013.01)

(58) Field of Classification Search
CPC ..... B60J 3/0204; B60R 11/04; B60R 2011/00
USPC .......................................................... 701/49
See application file for complete search history.

(56) References Cited

U.S. PATENT DOCUMENTS

| | | | | | |
|---|---|---|---|---|---|
| 6,666,493 | B1 * | 12/2003 | Naik | ..................... | B60J 3/0204 |
| | | | | | 296/97.4 |
| 10,906,381 | B1 * | 2/2021 | Muhammad | ........... | B60J 3/0213 |
| 11,192,430 | B2 * | 12/2021 | Urano | ................... | B60J 1/2016 |

| | | | | | |
|---|---|---|---|---|---|
| 2010/0106603 | A1 * | 4/2010 | Dey | ................ | G08G 1/096811 |
| | | | | | 705/14.63 |
| 2011/0096165 | A1 * | 4/2011 | Zeng | ................... | B60K 31/0008 |
| | | | | | 348/148 |
| 2011/0098894 | A1 * | 4/2011 | Zeng | ...................... | B60J 3/0204 |
| | | | | | 701/49 |
| 2013/0218449 | A1 * | 8/2013 | Hymel | .............. | G01C 21/3461 |
| | | | | | 701/538 |
| 2015/0367713 | A1 * | 12/2015 | Kim | ....................... | B60J 3/0239 |
| | | | | | 296/97.2 |
| 2017/0072774 | A1 * | 3/2017 | Kim | ....................... | B60J 3/0208 |
| 2017/0106728 | A1 * | 4/2017 | Nania | ................... | B60J 3/0243 |
| 2018/0065452 | A1 * | 3/2018 | Jung | ...................... | B60J 1/2016 |
| 2018/0099545 | A1 * | 4/2018 | Prokhorov | .............. | B60J 3/002 |
| 2018/0128044 | A1 * | 5/2018 | Ochiai | ................... | G02F 1/137 |

(Continued)

FOREIGN PATENT DOCUMENTS

GB          2598826 A  *  3/2022  ............ B60J 3/0208

OTHER PUBLICATIONS

Glare, Mar. 23, 2022, merriam-webster.com, pp. 1-6.*

*Primary Examiner* — Andrew R Dyer
(74) *Attorney, Agent, or Firm* — Brooks Kushman P.C.

(57) ABSTRACT

A method including receiving a first position of a sun visor of a vehicle; receiving a route of the vehicle from a navigation system of the vehicle, the route having at least one waypoint; determining a predicted amount of sunlight in an occupant's eyes at the at least one waypoint of the route; determining whether the predicted amount of sunlight in the occupant's eyes at the at least one waypoint of the route is greater than a predefined threshold amount; and instructing the sun visor to move to a second position in response to the predicted amount of sunlight exceeding the predefined threshold amount to block at least a portion of the predicted amount of sunlight from the occupant's eyes at the at least one waypoint is disclosed.

19 Claims, 2 Drawing Sheets

(56)  References Cited

U.S. PATENT DOCUMENTS

| 2018/0164107 | A1* | 6/2018 | Yalla | G06V 20/56 |
| 2019/0152303 | A1* | 5/2019 | Ghannam | B60J 3/04 |
| 2019/0389282 | A1* | 12/2019 | Wang | B60J 3/0243 |
| 2020/0290438 | A1* | 9/2020 | Jenkins | B60Q 3/252 |
| 2020/0298677 | A1* | 9/2020 | Katsura | E06B 9/24 |
| 2021/0023916 | A1* | 1/2021 | Gregory | B60J 3/026 |
| 2021/0347298 | A1* | 11/2021 | Balch | B60Q 9/005 |
| 2022/0118909 | A1* | 4/2022 | Kang | G06V 40/18 |
| 2023/0020061 | A1* | 1/2023 | Todd | G06V 40/161 |
| 2023/0134306 | A1* | 5/2023 | Zhang | B60J 3/0204 |
| | | | | 160/5 |

\* cited by examiner

*300*

Start

Receive sun visor position
302

Receive route
304

Receive driver monitoring data
306

Predict sunlight at at least one
waypoint
308

Does predicted sunlight
exceed threshold?
310

No

Yes

Instruct sun visor to move to a
second position
312

End

Motor
138

Controller 120

Interior
Camera
116

Sun Sensor
126

Navigation
System
134

*100*

ACTIVE DYNAMIC SUN VISOR AND METHOD OF OPERATION THEREOF

TECHNICAL FIELD

The present disclosure relates generally to an active dynamic sun visor and method of operation thereof.

BACKGROUND

Vehicles often include sun visors to aid in blocking the sun from occupant's eyes. Such sun visors may easily be movable to allow for adjustment to the specific angle of the sun. Even in high-end luxury cars, drivers and passengers manually adjust their sun visors when they are driving. For example, the drivers may adjust their sun visor when driving east in the morning and then again when driving west in the evening. Drivers may be temporarily blinded when the sunlight directly hits their eyes, leading to the driver to take his or her hands off the steering wheel to adjust the sun visor to view the road safely.

SUMMARY

A method may include receiving a first position of a sun visor of a vehicle; receiving a route of the vehicle from a navigation system of the vehicle, the route having at least one waypoint; determining a predicted amount of sunlight in an occupant's eyes at the at least one waypoint of the route; determining whether the predicted amount of sunlight in the occupant's eyes at the at least one waypoint of the route is greater than a predefined threshold amount; and instructing the sun visor to move to a second position in response to the predicted amount of sunlight exceeding the predefined threshold amount to block at least a portion of the predicted amount of sunlight from the occupant's eyes at the at least one waypoint.

The method may further include activating at least one motor to automatically adjust the sun visor to the second position as the vehicle approaches the at least one waypoint of the route.

The activating the at least one motor to automatically adjust the sun visor to the second position may occur when the vehicle is within a predetermined timing threshold of the at least one waypoint of the route. The predetermined timing threshold is approximately 30 seconds.

The determining the predicted amount of sunlight in the occupant's may include: determining a direction of the vehicle at the at least one endpoint of the route; and determining an angle in which the sun is positioned to the occupant's eyes based on a predicted position of the sun and the direction of the vehicle.

The method may further comprise receiving an indication of an amount of sunlight entering the vehicle and a sun path from a sun sensor. The sun sensor may include a light brightness detector.

The method may further comprise receiving a gaze detection from a second vehicle camera, the gaze detection indicating the location of the occupant's eyes relative to the sun visor and the sun path.

The method may further comprise receiving a first position of a second sun visor of a vehicle separate and distinct form the sun visor; receiving a route of the vehicle from a navigation system of the vehicle, the route having at least one waypoint; determining a predicted amount of sunlight in an occupant's eyes at the at least one waypoint of the route; determining whether the predicted amount of sunlight in the occupant's eyes at the at least one waypoint of the route is greater than a predefined threshold amount; and instructing the sun visor to move to a second position in response to the predicted amount of sunlight exceeding the predefined threshold amount to block at least a portion of the predicted amount of sunlight from the occupant's eyes at the at least one waypoint. The second sun visor may be disposed on a door window of the vehicle.

An active dynamic sun visor system may include a sun visor having a motor to automatically adjust the position of the sun visor; a driver camera configured to detect the gaze of an occupant of a vehicle; a front sensor configured to detect brightness of sunlight on a windshield of the vehicle; and a controller configured to receive the gaze and determine a location of the occupant's eyes relative to the sun visor; receive the detected brightness from the front sensor; determine an amount of sunlight in the occupant's eyes based at least in part on the detected brightness of sunlight from the front sensor and the location of the occupant's eyes; and instruct the motor of the sun visor to alter the position of the sun visor in response to the amount of sunlight in the occupant's eyes exceeding a predetermined threshold.

The controller may calculate a future amount of sunlight in the occupant's eyes at a waypoint on the route given a starting position of the sun visor's and determines whether the future amount of sunlight at the starting position of the sun visor is greater than the predetermined threshold. The controller may determine a second position of the sun visor where the future amount of sunlight in the occupant's eyes at the waypoint of the route is less than the predetermined threshold. The controller may send control information to the motor to move the sun visor to the second position. The controller may determine a present amount of sun in the occupant's eyes when the first visor is at the second position using the at least one signal from the driver camera and the at least one signal from the sun sensor.

The active dynamic sun visor system may further comprise a temperature gauge, wherein the controller is configured to receive a temperature of the vehicle from the temperature gauge. The controller may determine a present temperature of the vehicle is greater than a predetermined threshold temperature, the controller sends control information to the sun visor to move into a fully extended position.

The active dynamic sun visor system may further comprise a second sun visor; and a second motor configured to control the position of the second sun visor and to receive control information from the controller. The controller may determine a second position of the second sun visor where the future amount of sunlight in the occupant's eyes at the waypoint of the route is less than the predetermined threshold; the controller sends control information to the motor to move the second sun visor to the second position; and the controller determines a present amount of sun in the occupant's eyes when the first visor is at the second position using the at least one signal from the driver camera and the at least one signal from the front sensor. The second sun visor may be disposed on a door window of the vehicle.

DETAILED DESCRIPTION

As required, detailed exemplary arrangements of the present disclosure are disclosed herein; however, it is to be understood that the disclosed exemplary arrangements are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Manually or mechanically activated sun visor devices have been developed to avoid drivers taking his or her hands off the steering wheel while driving. One such device includes a motorized sun visor that can be activated and positioned by the driver pressing an actuator button. However, current sun visors do not predict when the sun visor needs to be adjusted to shield the driver's eyes prior to sunlight shining directly in the driver's face. Such intermediate sunlight may cause for brief distractions for the driver of the vehicle.

Disclosed herein is a sun visor system configured to predict when sunlight will shine on the driver's face and automatically adjust the sun visor before the sunlight creates a possible distraction for the driver. The system may predict the position of the sun based on the time of day, GPS location, and inputs from vehicle front cameras. The system may then calculate the angle in which the sun is positioned to the occupant's eyes. Further, the system may receive additional feedback from a sensor on the dash, and predict the next turn of the vehicle based on the map from the navigation system. The system may then control the sun visor to move it to a most optimal position to block the sun from the occupant's eyes.

Figure 1:
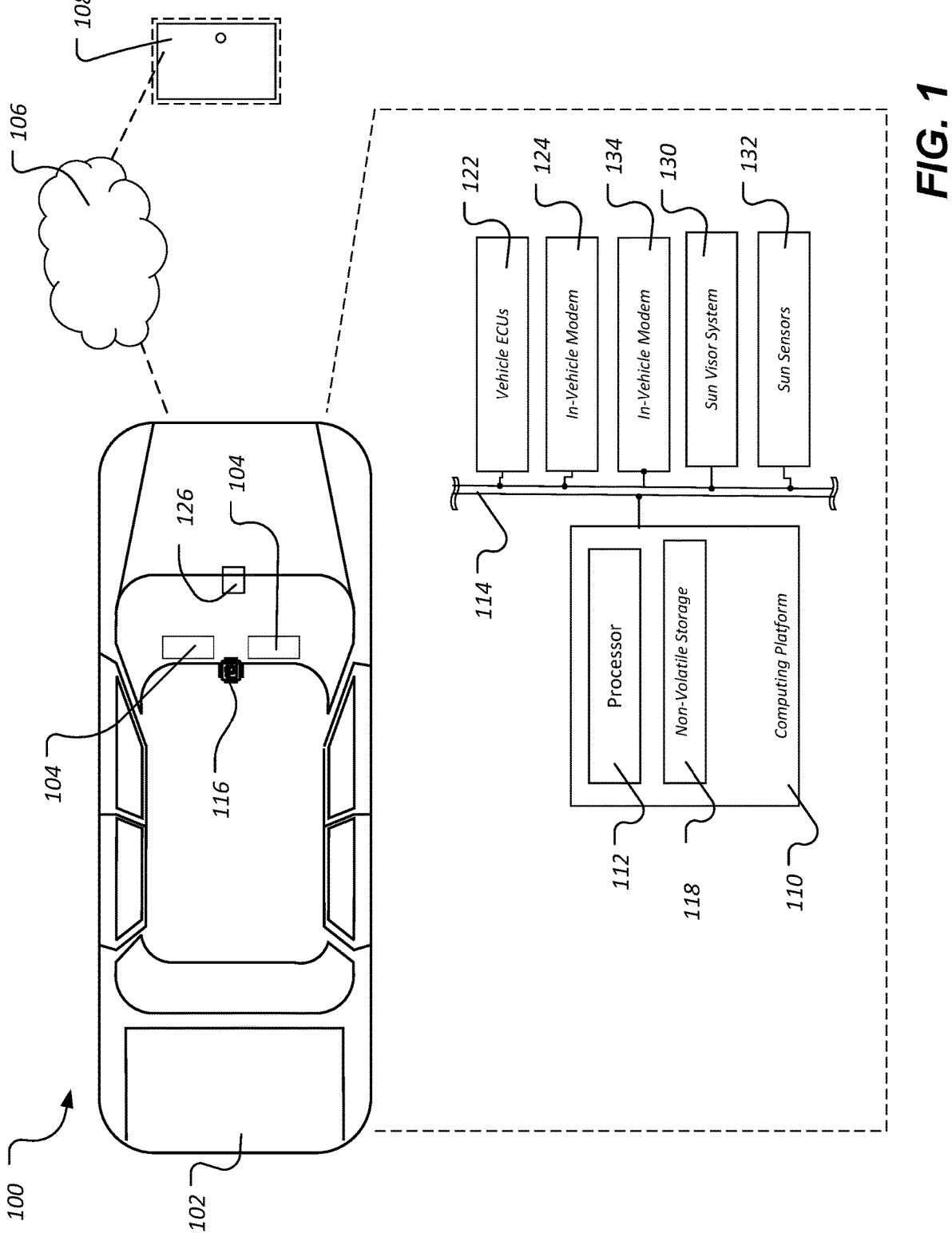
FIG. 1 illustrates a block diagram for the active dynamic sun visor system.

FIG. 1 illustrates a block diagram for an active dynamic sun visor system 100. The active dynamic sun visor system 100 may be designed for a vehicle 102 configured to transport passengers. The vehicle 102 may include various types of passenger vehicles, such as crossover utility vehicle (CUV), sport utility vehicle (SUV), truck, recreational vehicle (RV), boat, plane or other mobile machine for transporting people or goods. The vehicle 102 may include at least one sun visor 104. While a vehicle 102 having two sun visors 104 is illustrated, other vehicles using more or fewer sun visors 104 may also be appreciated.

The sun visor 104 may be attached at a headliner of the vehicle at a joint (not labeled). The joint may allow for axial, as well as angular translation of the sun visor 104. The sun visor 104 may be configured to block sunlight from interfering with the occupant's sight, causing distractions, and increase overall enjoyment and comfort while driving. The sun visor 104 may move between a stored position, where the visor 104 is flush with the vehicle ceiling, or an extended position where the visor 104 is removed from the stored position to a desired position. The sun visor 104 may include a motor 138 at the joint to move the visor 104 to a desired position. The user may also manually position the sun visor 104.

The vehicle 102 may be autonomous, partially autonomous, self-driving, driverless, or driver-assisted vehicles. The vehicle 102 may be an electric vehicle (EV), such as a battery electric vehicle (BEV), plug-in hybrid electric vehicle (PHEV), hybrid electric vehicle (HEVs), etc. The vehicle 102 may be configured to include various types of components, processors, and memory, and may communicate with a communication network 106. The communication network 106 may be referred to as a "cloud" and may involve data transfer via wide area and/or local area networks, such as the Internet, global navigation satellite system (GNSS), cellular networks, Wi-Fi®, Bluetooth®, etc. The communication network 106 may provide for communication between the vehicle 102 and an external or remote server 108 and/or database, as well as other external applications, systems, vehicles, etc. The communication network 106 may provide for communication between an onboard communication system and an onboard server 108 and/or database. This communication network 106 may provide data and/or services to the vehicle 102 such as navigation (also referred to herein as a navigation system 136), music or other audio, program content, marketing content, software updates, system updates, Internet access, speech recognition, cognitive computing, artificial intelligence, etc.

The remote server 108 may include one or more computer hardware processors coupled to one or more computer storage devices for performing steps of one or more methods as described herein (not shown). These hardware elements of the remote server 108 may enable the vehicle 102 to communicate and exchange information and data with systems and subsystems external to the vehicle 102 and local to or onboard the vehicle 102. The vehicle 102 may include a computing platform 110 having one or more processors 112 configured to perform certain instructions, commands and other routines as described herein. Internal vehicle networks 114 may also be included, such as a vehicle controller area network (CAN), an Ethernet network, and a media oriented system transfer (MOST), etc. The internal vehicle networks 114 may allow the processor 112 to communicate with other vehicle systems, such as an in-vehicle modem 124, and various vehicle electronic control units (ECUs) 122 configured to corporate with the processor 112.

The processor 112 may execute instructions for certain vehicle applications, including sun visor monitoring, navigation, infotainment, climate control, etc. Instructions for the respective vehicle systems may be maintained in a non-volatile manner using a variety of types of computer-readable storage medium 118 (also referred to herein as memory 118, or storage 118). The computer-readable storage medium 118 includes any non-transitory medium (e.g., a tangible medium) that participates in providing instructions or other data that may be read by the processor 112. Computer-executable instructions may be compiled or interpreted from computer programs created using a variety of programming languages and/or technologies, including, without limitation, and either alone or in combination, Java®, C, C++, C#, Objective C™, Fortran, Pascal, Java Script™, Python®, Perl™, and PL/structured query language (SQL).

Vehicle ECUs 122 may be incorporated or configured to communicate with the computing platform 110. As some non-limiting possibilities, the vehicle ECUs 122 may include a powertrain control system, a body control system, a radio transceiver module, a climate control management system, human-machine interface (HMI)'s, etc. The in-vehicle modem 124 may be included to communicate information between the computing platform 110, the vehicle 102, and the remote server 108.

A navigation system 134 may be an in-vehicle navigation system configured to provide turn-by-turn directions to the vehicle based on the vehicles' current location. Additionally or alternatively the navigation system may be managed on a user device, such as the user's mobile phone. The navigation system may coordinate with the vehicle's position sensors to determine current locations, headings, speed, etc. The navigation system 143 is configured to provide route information to the controller 120, which may include at least one waypoint, as described above. The navigation system 134 may receive vehicle position data from a global positioning system (GPS), Global Navigation Satellite System (GNSS), etc.

The active dynamic sun visor system 100 may have at least one interior camera 116 (also referred to herein as driver camera 116). The interior camera 116 may be configured to detect the gaze of an occupant in the vehicle. The occupant in the vehicle 102 may be the driver of the vehicle or a passenger. The interior camera 116 may be a special purpose camera configured to collect images of the interior of the cabin for multiple purposes, such as occupant detection, etc. In detecting the gaze of the occupant, the interior camera 116 may detect a relative eye level of the occupant within the vehicle 102. For example, one occupant may sit higher than another, and thus that occupant's eyes will be at a different position than another, say, child's eyes. The interior camera 116 may transmit the images to the processor 112 and the processor 112 may determine an occupant gaze, which may also identity the relative location of the user's face and/or eyes.

The active dynamic sun visor system 100 may have a sun sensor 126 (also referred to herein as front sensor 126) configured to detect brightness of sunlight on a windshield of the vehicle. The sun sensor 126 may be disposed at any location sufficient to detect the brightness of sunlight on the windshield. In the example shown in FIG. 1, the sun sensor 126 is arranged at the windshield of the vehicle 102, for example, on the front of the dashboard. The sun sensor 126 may be a camera configured to detect the brightness of the sun at the windshield. The sun sensor 126 may also be a sun load sensor configured to measure the intensity of the sunlight. The sun sensor 126 may transmit the detected brightness to the processor 112.

The processor 112 may be configured to receive the gaze and determine a location of an occupant's eyes relative to the sun visor 104. The processor 112 may be configured to receive the detected brightness from the sun sensor 126. The processor 112 may be configured to determine an amount of sunlight in the occupant's eyes based at least in part on the detected brightness of sunlight from the front sensor and the location of the occupant's eyes. The processor 112 may be configured to instruct the motor 138 of the sun visor 104 to alter the position of the sun visor 104 in response to the amount of sunlight in the occupant's eyes exceeding a predetermined threshold.

Additionally, the processor 112 may be configured to calculate a future or predicted amount of sunlight to hit the occupant's eyes at a waypoint along a route. Such prediction may be based on a current position of the sun visor 104 and a predicted brightness at the waypoint. If the predicted brightness at the waypoint is greater than a predetermined threshold, and the current position of the sun visor 104 would not block the sun, the processor 112 may instruct the sun visor 104 to move to a predetermined or second position to block the sun at the at least one waypoint. A waypoint may be any specific point along a route. The processor 112 may continuously calculate the amount of sunlight along a route a various waypoints and continually adjust the sun visor 104 in view of the amount of sunlight. The waypoint may also be an end point along the route.

In another example and use case, the active dynamic sun visor system 100 may include a temperature gauge and transmit a cabin temperature to the processor 112. The processor 112 may compare the cabin temperature to a predetermined threshold temperature and send control information to the sun visor 104 to move into a fully extended position in response to the cabin temperature exceeded the predetermined threshold. For example, the active dynamic sun visor system 100 may deploy the sun visors 104 of the vehicle 102 when the vehicle is parked in a parking lot on a sunny day, to reduce the amount of sunlight entering the vehicle.

The processor 112 may do an analysis for each visor 104. For example, the interior camera 116 may determine an eye level for the passenger and adjust the visor 104 according thereto. Further, more than one visor may be used for each seat location or window.

The memory 118 may maintain data and may use previously stored data to perform the analysis. The processor 112 may determine certain changes to the sunlight on the vehicle 102 by comparing previous data for a sun visor 104 to the most recently received sunlight data for the sun visor 104. The memory 118 may also maintain user preferences and instruct for adjustments to the sun visor 104 according to the user preferences.

The vehicle 102 may also include a wireless transceiver (not shown), such as a BLUETOOTH® module, a ZIGBEE transceiver, a Wi-Fi® transceiver, an IrDA transceiver, a radio frequency identification (RFID) transceiver, etc.) configured to communicate with compatible wireless transceivers of various user devices, as well as with the communication network 106.

Figures 2, 3:
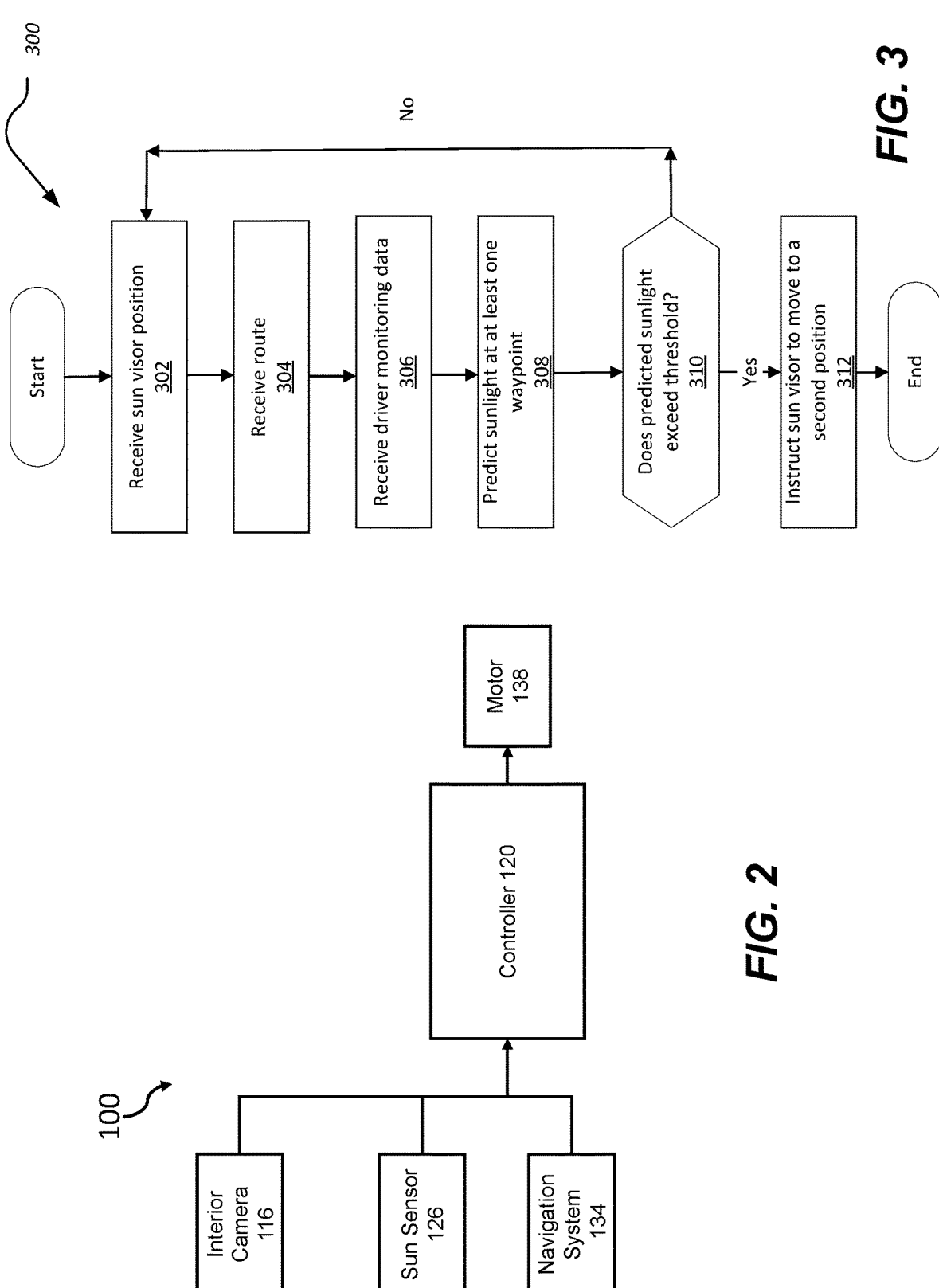
FIG. 2 illustrates another block diagram for the active dynamic sun visor system of FIG. 1.
FIG. 3 illustrates a block diagram for the method of the controller of the active dynamic sun visor system.

FIG. 2 illustrates another example block diagram for the active dynamic sun visor system 100. Similar to FIG. 1, the active dynamic sun visor system 100 may include the interior camera 116, sun sensor 126, and navigation system 134.

The interior camera 116 may be configured to detect the gaze of an occupant in the vehicle 102. The occupant in the vehicle 102 may be the driver of the vehicle 102 or a passenger. As explained above, the camera 116 may detect a relative eye level of the occupant within the vehicle 102. The camera 116 may detect a change in dilation of the occupant's pupil within the vehicle 102. Such eye level and/or change in eye dilation may be important in determining whether sun light will hit an occupant's eyes and how to best adjust the sun visor 104 to avoid this.

The sun sensor 126 (also referred to herein as front sensor 126) may be configured to detect brightness of sunlight on a windshield of the vehicle 102. The sun sensor 126 may be disposed at any location sufficient to detect the brightness of sunlight exterior to the vehicle. In the example shown in FIG. 1, the sun sensor 126 is arranged at the windshield of the vehicle 102, for example, on the front of the dashboard. The sun sensor 126 may be a camera configured to detect the brightness of the sun at the windshield. The sun sensor 126 may also be a sun load sensor configured to measure the intensity of the sunlight. The sun sensor 126 may transmit the detected brightness to the processor 112.

As explained, the navigation system 134 may provide turn-by-turn directions to the vehicle based on the vehicles' current location. The navigation system may coordinate with the vehicle's position sensors to determine current locations, headings, speed, etc. The navigation system 143 is configured to provide route information to the controller 120, which may include at least one waypoint.

The interior camera 116, the sun sensor 126, and the navigation system 134 provide data pertaining to the gaze of the occupant in the vehicle 102, the brightness of sunlight on the windshield of the vehicle 102, the location information of the vehicle 102, and the route to the controller 120. The controller 120 may be included in the processor 112 to process the data received from the interior camera 116, the sun sensor 126, and the navigation system. Additionally or alternatively, the controller 120 may include a separate processor.

The active dynamic sun visor system 100 may include a motor 138 configured to move a sun visor 104. The controller 120 may be configured to instruct the motor 138 of the sun visor 104 to alter the position of the sun visor 104 in response to the amount of sunlight in the occupant's eyes exceeding a predetermined threshold.

FIG. 3 illustrates an example flow chart for a process 300 of the active dynamic sun visor system 100. The process 300 may begin at block 302 where the controller 120 receives a first position of a sun visor 104 of a vehicle 102. This first position may be a closed position of the sun visor 104, or an existing location of the sun visor 104. The first position may be detectable via various actuators within the joint of the sun visor 104. Further, the processor 112 may retrieve the last known position of the sun visor 104 from the memory 118.

At block 304, the controller 120 may receive a route of the vehicle from a navigation system 136 of the vehicle 102, the route having at least one waypoint.

At block 306, the controller 120 receive driver monitoring data from the camera 116. This data may be used to determine a position of the user's eyes.

At block 308, the controller 120 may predict the amount of sunlight in an occupant's eyes at the at least one waypoint of the route. Determining a predicted amount of sunlight in an occupant's eyes at the at least one waypoint of the route may include determining a direction of the vehicle at the at least one waypoint of the route and determining an angle in which the sun is positioned to the occupant's eyes based on a predicted position of the sun and the direction of the vehicle 102. In one example, the front camera 116 may provide for visual confirmation of the sunlight at or near the waypoint.

At block 310, the controller 120 may determine whether the predicted amount of sunlight in the occupant's eyes at the at least one waypoint of the route is greater than a predefined threshold amount.

At block 312, the controller 120 may instruct the sun visor 104 to move to a second position in response to the predicted amount of sunlight exceeding the predefined threshold amount to block at least a portion of the predicted amount of sunlight from the occupant's eyes at the at least one waypoint. The position may be based on the predicted amount of sunlight and the direction of the vehicle based on the route. The position may also be predicted based on an estimated sun angle, as identified based on time of day.

The controller 120 may activate at least one motor 138 to automatically adjust the sun visor 104 to the second position as the vehicle 102 approaches the at least one waypoint of the route. The activating may occur when the vehicle 102 is within a predetermined timing threshold of the at least one waypoint of the route. For example, predetermined timing threshold may be 1 minute before reaching the waypoint, 30 seconds before reaching the waypoint, or 10 seconds before reaching the waypoint. This threshold may also be a distance threshold, such as 60 meters, 1 kilometer, etc.

The process 300 of the active dynamic sun visor system 100 may also include the controller 120 receiving an indication of an amount of sunlight entering the vehicle from the sun sensor 126. The sun sensor 126 may be a camera configured to detect the brightness of the sun at the windshield. The sun sensor 126 may also be a sun load sensor configured to measure the intensity of the sunlight. The sun sensor 126 may be, for example, a light brightness detector. The process 300 may also include the controller 120 receiving a gaze detection from a second vehicle camera, the gaze detection indicating a location of the occupant's eyes relative to the sun visor and the sun path. The sun path may be determined based on the time of day and the known position of the sun at that time of day.

The process 300 of the active dynamic sun visor system 100 may apply to other sun visors within the vehicle, such as a passenger's side sun visor. Further, screens may also be controlled on the vehicle windows to increase the cabin comfort.

Various aspects of the current exemplary arrangements may be embodied as a system, a method, or a computer program product. Therefore, various aspects of the present disclosure may take the following forms: a complete hardware exemplary arrangement, a complete software exemplary arrangement (including firmware, resident software, microcode, etc.), or a combination of software and hardware exemplary arrangements, which may be all regarded as "module" or "system" generally herein. In addition, any hardware and/or software technology, process, function, component, engine, module, or system described in the present disclosure may be implemented as a circuit or a group of circuits. In addition, various aspects of the present disclosure may take the form of a computer program product embodied in one or more computer-readable media on which computer-readable program code is embodied.

Any combination of one or more computer-readable media may be utilized. The computer-readable mediums may be a computer-readable signal medium or a computer-readable storage medium. The computer-readable storage medium may be, for example, but not limited to, an electronic, magnetic, optical, electromagnetic, infrared, or semiconductor system, device or apparatus, or any suitable combination of the foregoing. More specific examples (non-exhaustive list) of computer-readable storage media may include each of the following: an electrical connection with one or more wires, a portable computer floppy disk, a hard disk, a random-access memory (RAM), a read only memory (ROM), an erasable programmable read-only memory (EPROM or flash memory), an optical fiber, a portable CD-ROM, an optical storage apparatus, a magnetic storage apparatus, or any suitable combination of the foregoing. In the context of this document, a computer-readable storage medium may be any tangible medium that can contain or store a program for use by an instruction execution system, device, or apparatus or in combination with the instruction execution system, device, or apparatus.

The aspects of the present disclosure are described above with reference to flowchart illustrations and/or block diagrams of methods, devices (systems) and computer program products according to the implementations of the present disclosure. It will be understood that each block of the flowchart illustrations and/or block diagrams and combinations of blocks in the flowchart illustrations and/or block diagrams may be implemented by computer program instructions. These computer program instructions may be provided to processors of general-purpose computers, special purpose computers, or other programmable data processing devices to produce machines. When the instructions are executed via the processors of the computers or other programmable data processing devices, the functions/actions specified in the flowchart and/or block diagram block or multiple blocks can be realized. These processors m be, but are not limited to, general purpose processors, special purpose processors, special application processors, or field programmable gate arrays.

The flowcharts and block diagrams in the drawings illustrate the architecture, functionality, and operation of possible implementations of systems, methods, and computer program products according to various exemplary arrangements of the present disclosure. In this regard, each block in the flowchart or block diagram may represent a module, section, or part of code, and the code includes one or more executable instructions for implementing prescribed logical functions. It should also be noted that in some alternative implementations, the functionality described in the blocks may occur out of the order described in the drawings. For example, two blocks shown in succession may actually be executed substantially simultaneously, or the blocks may sometimes be executed in the reverse order depending on the functionality involved. It should also be noted that each block in the block diagram and/or flowchart illustration and the combination of the blocks in the block diagram and/or flowchart illustration can be implemented by a dedicated hardware-based system or dedicated hardware and computer instructions that perform the specified functions or actions.

Although the foregoing content is directed to the exemplary arrangements of the present disclosure, other and additional exemplary arrangements of the present disclosure may be conceived without departing from the basic scope of the present disclosure, and the scope of the present disclosure is determined by the appended claims.

While exemplary arrangements are described above, it is not intended that these exemplary arrangements describe all possible forms of the disclosure. Rather, the words used in the specification are words of description rather than limitation, and it is understood that various changes may be made without departing from the spirit and scope of the disclosure. Additionally, the features of various implementing exemplary arrangements may be combined to form further exemplary arrangements of the disclosure.

What is claimed is:

1. A method comprising:
receiving a first position of a sun visor of a vehicle;
receiving a route of the vehicle from a navigation system of the vehicle, the route having a starting point and at least one waypoint after the starting point;
determining a predicted amount and angle of sunlight in an occupant's eyes at the at least one waypoint of the route based on the route and predicted sun at the waypoint;
determining that the predicted amount of sunlight in the occupant's eyes at the at least one waypoint of the route is greater than a predefined threshold amount; and
instructing the sun visor to move to a second position while the vehicle is along the route after the starting position in response to the predicted amount of sunlight exceeding the predefined threshold amount to block at least a portion of the predicted amount of sunlight from the occupant's eyes at the at least one waypoint.

2. The method of claim 1, further comprising activating at least one motor to automatically adjust the sun visor to the second position as the vehicle approaches the at least one waypoint of the route.

3. The method of claim 2, wherein the activating the at least one motor to automatically adjust the sun visor to the second position occurs in response to the vehicle being within a predetermined timing threshold of the at least one waypoint of the route.

4. The method of claim 3, wherein the predetermined timing threshold is 30 seconds.

5. The method of claim 1, wherein the determining the predicted amount of sunlight in the occupant's eyes includes:
determining a direction of the vehicle at the at least one waypoint of the route; and
determining an angle in which the sun is positioned to the occupant's eyes based on a predicted position of the sun and the direction of the vehicle.

6. The method of claim 1, further comprising receiving an indication of an amount of sunlight entering the vehicle and a sun path from a sun sensor.

7. The method of claim 6, further comprising receiving a gaze detection from an interior camera, the gaze detection indicating a location of the occupant's eyes relative to the sun visor and the sun path.

8. The method of claim 6, wherein the sun sensor includes a light brightness detector.

9. The method of claim 1, further comprising:
receiving a first position of a second sun visor of the vehicle separate and distinct from the sun visor;
determining a second predicted amount of sunlight in a second occupant's eyes at the at least one waypoint of the route;
determining whether the predicted amount of sunlight in the second occupant's eyes at the at least one waypoint of the route is greater than the predefined threshold amount; and
instructing the second sun visor to move to a second position in response to the second predicted amount of sunlight exceeding the predefined threshold amount to block at least a portion of the second predicted amount of sunlight from the second occupant's eyes at the at least one waypoint.

10. The method of claim 9, wherein the second sun visor is arranged on a headliner of the vehicle.

11. An active dynamic sun visor system, comprising:
a sun visor having a motor to automatically adjust the position of the sun visor;
a driver camera configured to detect the gaze of an occupant of a vehicle;
a front sensor configured to detect brightness of sunlight on a windshield of the vehicle; and
a controller configured to:
receive a route of the vehicle from a navigation system of the vehicle, the route having a starting point and at least one waypoint after the starting point;
receive the gaze and determine a location of an occupant's eyes relative to the sun visor;
receive the detected brightness from the front sensor;
determine an amount of sunlight in the occupant's eyes based at least in part on the detected brightness of sunlight from the front sensor and the location of the occupant's eyes;
instruct the motor of the sun visor to alter the position of the sun visor in response to the amount of sunlight in the occupant's eyes exceeding a predetermined threshold;
calculate a future amount of sunlight in the occupant's eyes at the at least one waypoint of the route after a starting position based on the route and future amount of sunlight at the waypoint and determine whether the future amount of sunlight at the way-point is greater than the predetermined threshold; and instruct the sun visor to move to a second position while the vehicle is along the route after the starting position in response to the future amount of sunlight exceeding the predefined threshold amount to block at least a portion of the future amount of sunlight from the occupant's eyes at the at least one waypoint.

12. The active dynamic sun visor system of claim 11, wherein the controller determines a present amount of sun in the occupant's eyes when the sun visor is at the second position using the at least one signal from the driver camera and the at least one signal from the front sensor.

13. The active dynamic sun visor system of claim 11, further comprising a temperature gauge, wherein the controller is configured to receive a temperature of the vehicle from the temperature gauge.

14. The active dynamic sun visor system of claim 13, wherein the controller determines a present temperature of the vehicle is greater than a predetermined threshold temperature, the controller sends control information to the sun visor to move into a fully extended position.

15. The active dynamic sun visor system of claim 11, further comprising:

a second sun visor; and a second motor configured to control the position of the second sun visor and to receive control information from the controller.

16. The active dynamic sun visor system of claim 15, wherein the controller is programmed to determine a second position of the second sun visor where the amount of sunlight in the occupant's eyes is less than the predetermined threshold;

transmit control information to the second motor to move the second sun visor to the second position; and determine a present amount of sun in the occupant's eyes when the second sun visor is at the second position using the at least one signal from the driver camera and the at least one signal from the front sensor.

17. The active dynamic sun visor system of claim 15, wherein the second sun visor is arranged on a headliner of the vehicle.

18. The active dynamic sun visor system of claim 11, wherein the controller is configured to activate at least one motor to automatically adjust the sun visor to the second position as the vehicle approaches the at least one waypoint of the route.

19. The active dynamic sun visor system of claim 18, wherein the controller is configured to activate the at least one motor to automatically adjust the sun visor to the second position occurs in response to the vehicle being within a predetermined timing threshold of the at least one waypoint of the route.

* * * * *